April 3, 1928.
H. C. SCHAPER
1,664,833
MICROMETER CALIPER
Filed March 2, 1925
3 Sheets-Sheet 1
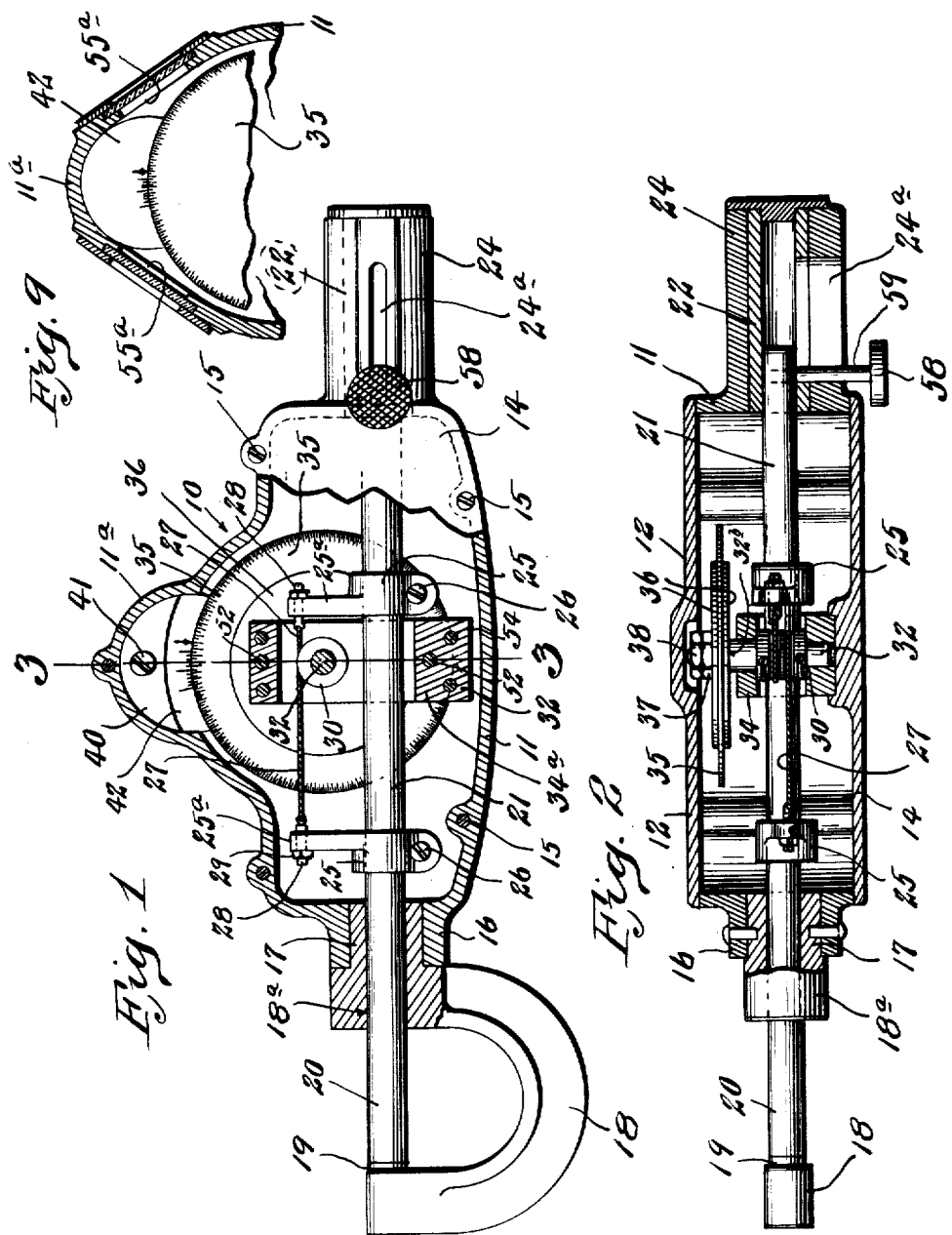
Inventor
Harry C. Schaper
By Cornwall, Bedell & Janus
Att'ys

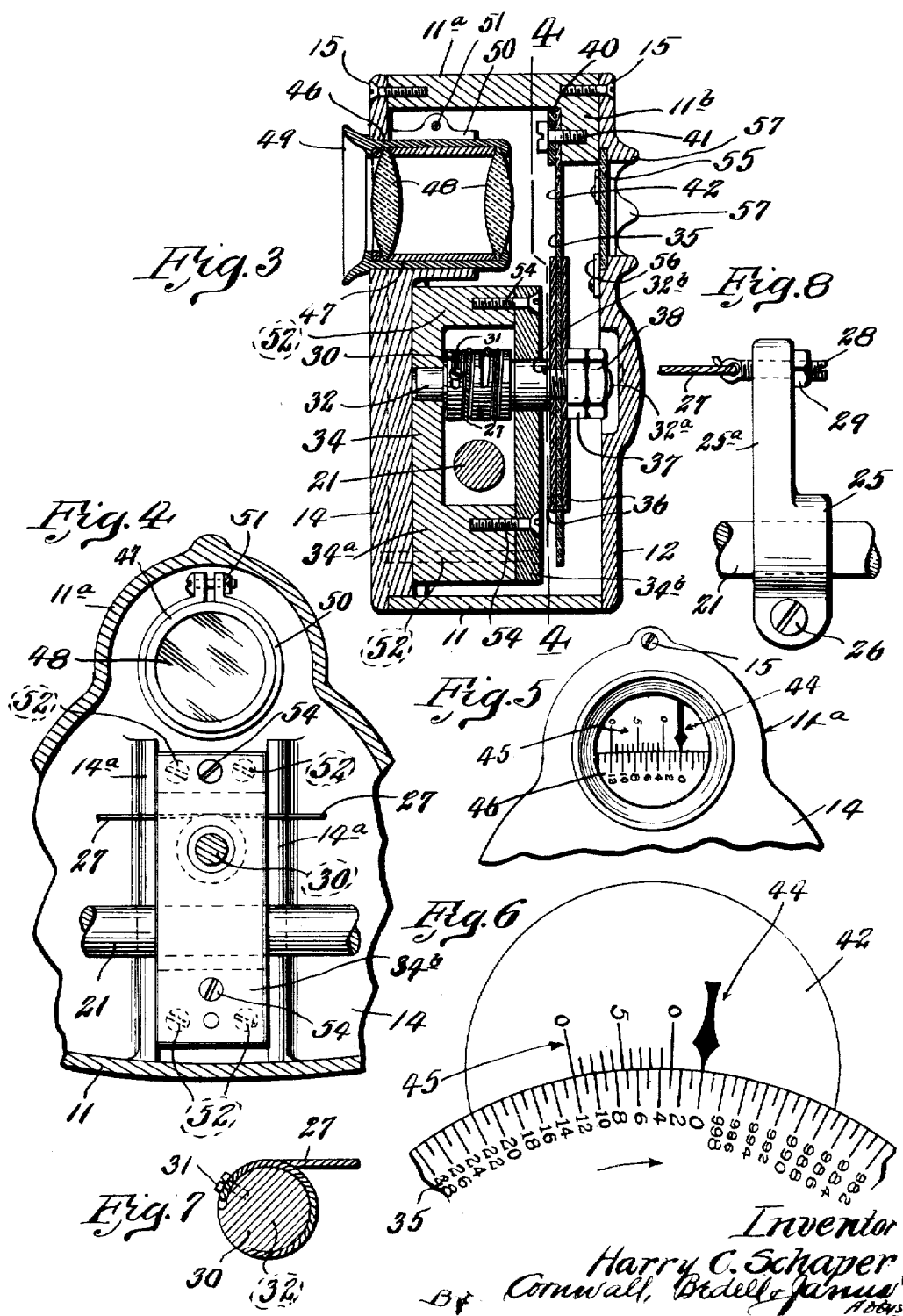

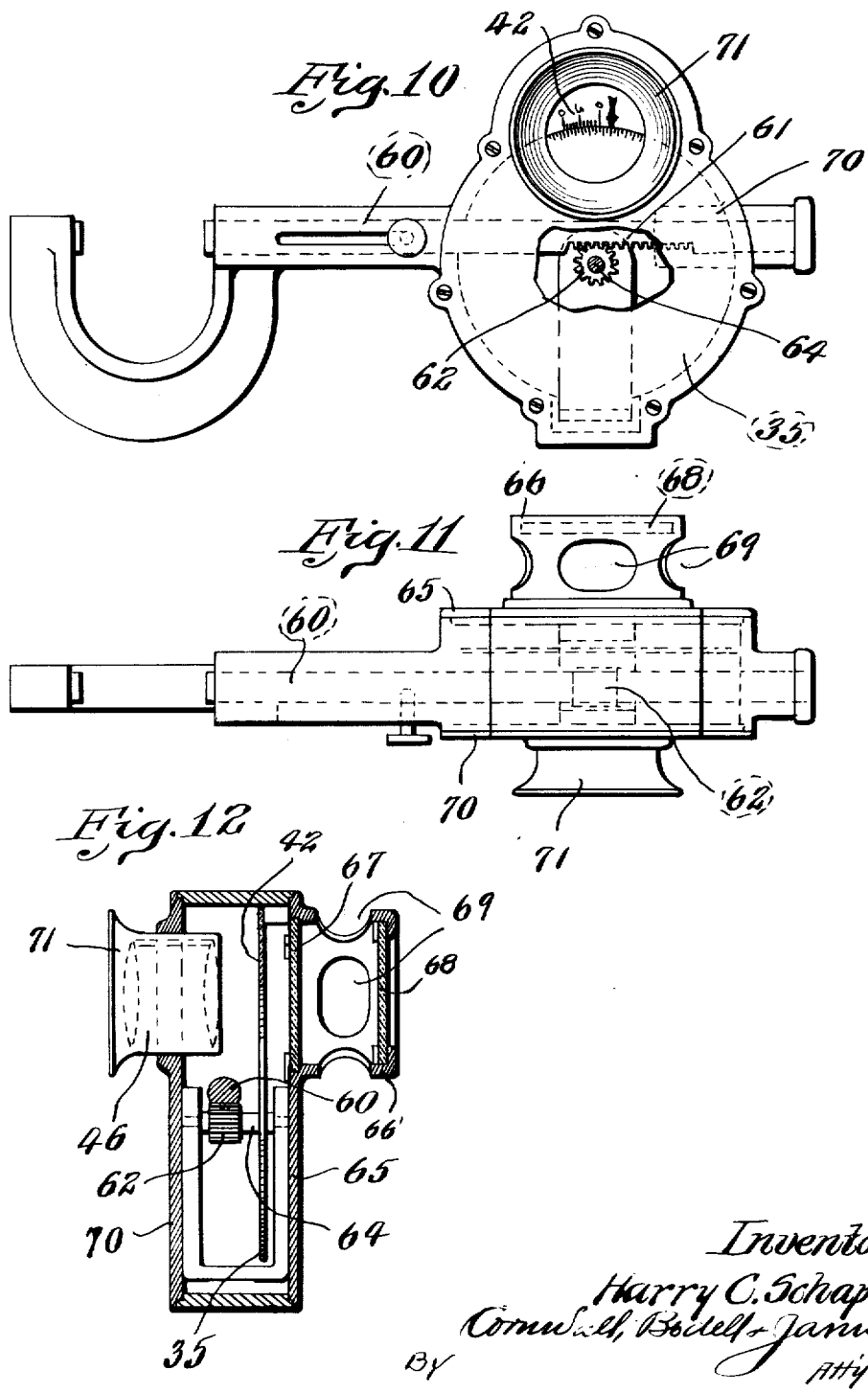

Patented Apr. 3, 1928.

1,664,833

UNITED STATES PATENT OFFICE.

HARRY C. SCHAPER, OF ST. LOUIS, MISSOURI.

MICROMETER CALIPER.

Application filed March 2, 1925. Serial No. 12,469.

This invention relates to new and useful improvements in micrometer calipers, the objects being to provide an instrument of the class described wherein the graduations or marks are carried by a suitable member and are readable in magnified form, thereby enabling the operator to read the graduations with greater ease and accuracy.

Further objects of the invention are to provide a movable indicia bearing member operable in conjunction with the longitudinally movable plunger of the micrometer to accurately indicate the distance between the measuring points of the instrument, and to provide a suitable lens system for reading the indicia on said movable member in a magnified form.

Other objects of the invention are to provide a suitable and compact housing for enclosing the operating and reading parts of the instrument and having fixed thereto a yoke or anvil member which forms one of the work-engaging members and is in cooperative relation with the other work-engaging member or plunger, which is in operative engagement with the indicating mechanism of the instrument.

Still further objects of the invention are to generally simplify and improve the construction of an instrument of the class described and to enable the economical manufacture thereof.

With these and other objects in view, my invention consists in certain novel features of construction and arrangement of parts, hereinafter more fully described and claimed, and illustrated in the accompanying drawings, in which—

Figure 1 is a top plan view of the instrument with the housing thereof in cross section.

Figure 2 is a horizontal cross section taken longitudinally through the instrument and showing parts thereof in elevation.

Figure 3 is an enlarged vertical cross section taken on line 3—3 of Figure 1.

Figure 4 is a vertical cross section taken on line 4—4 of Figure 3.

Figure 5 is a fragmental view of the instrument showing the reading portion thereof.

Figure 6 is an enlarged plan view of the stationary reading member and the movable chart or indicia bearing member.

Figure 7 is a detail view illustrating operative connection between the longitudinally movable plunger and the movable chart member.

Figure 8 is a detail view showing the means for connecting the operative connection to the plunger.

Figure 9 is a detail view showing a modified form for illuminating the indicating members of the instrument.

Figure 10 is a top plan view of a modified form of my improved instrument, partly in cross section.

Figure 11 is a side elevational view of same.

Figure 12 is a vertical cross section taken transversely through the instrument and showing parts thereof in elevation.

Heretofore in the construction of micrometer calipers, a rotatable spindle was provided for engaging the work between one end thereof and a stationary end. This spindle was movable longitudinally by means of a fine screw-thread and a graduated thimble was used to indicate the extent of movement of said spindle or the distance between the measuring or work engaging points of said members. The manipulation of the spindle was slow due to the fine screw thread and mistakes often occurred in reading the finely graduated scale of the thimble.

In the present invention, I provide a reciprocable plunger having one end adapted to act as the work engaging or abutment member for cooperating with the stationary member or anvil. This plunger is operatively connected to a member bearing a series of marks or graduations correlated to a fixed pointer or indicator. This movable member is operable to locate a certain mark or graduation in correlation with the fixed pointer in accordance with the movement of said plunger or the distance between the measuring points of said plunger and the anvil. The operative connection between the plunger and the movable chart member is adjustable so as to properly align said chart member with said plunger.

Referring by numerals to the accompanying drawings, 10 indicates a casing for housing the operating and indicating mechanisms of the instrument, said casing comprising a body portion 11 and side plates or covers 12 and 14, respectively, which are removably secured to the body portion 11 by screws or other fastening means 15. Body portion 11 is provided at one end with a tubular extension 16 in which is fixedly mounted a sleeve 17 having a yoke 18. An anvil or fixed member 19 is mounted in the remote end of yoke 18 in axial alignment with the projecting or work engaging end 20 of a plunger 21, which is longitudinally disposed in body portion 11 and has its free end slightly mounted in sleeve 17 and bearing 18$^a$ formed in yoke 18 and its opposite end slidably arranged in a bearing or sleeve 22 which is arranged in a tubular extension 24 formed integral with body portion 11 and oppositely disposed to extension 16.

Adjustably fixed on plunger 21 and suitably spaced from each other are collars 25 which are adapted to be securely clamped in their adjusted positions by means of screws 26. Prospecting outwardly from collars 25 are fingers 25$^a$ to which are secured in any suitable manner the ends of flexible connections or cords 27. If desired, said ends of connections 27 can be adjustably connected to fingers 25$^a$ by screws 28 screw-seated in said fingers and locked in position by lock nuts 29. The opposite or inner ends of connections 27 operate over annular grooves formed on a pulley 30 and are anchored thereto by suitable fastening devices 31. Pulley 30 is mounted on a shaft 32 which is rotatably supported in position by a mounting 34.

One end of shaft 32 is provided with a reduced portion 32$^a$ thereby forming a shoulder 32$^b$ and arranged on said reduced portion is a chart member or disk 35 which is clamped in position by a pair of washers or disks 36 arranged on the opposite sides of chart member 35 so that one of said disks or washers bears against the shouldered portion 32$^b$ of shaft 32 while the opposite or outer washer 36 is engaged by a nut 37 which is threaded on portion 32$^a$ and is locked in position by a lock nut 38. Thus chart member 35 can be securely clamped on the shaft 32 without danger of causing said shaft to bind or stick in its bearings. Disk or chart member 35 is provided contiguous to its annular edge with a series of graduations or indicia which are graduated or spaced to indicate the movement of the plunger 21 in one thousandth of an inch measurements. Body portion 11 is provided at one side with a semi-circular extension 11$^a$ in which is arranged an inwardly projecting lug 11$^b$. Resting on this lug and clamped in position thereon by a plate 40 and a screw 41 is a plate 42 which is arranged in the same plane with chart member 35 and has one edge formed concentric with said chart so as to permit said chart and said plate to be placed in close relation with each other as shown in Figure 6.

Plate 42 has arranged thereon a pointer 44 which is used to determine or select the proper mark or indicia of the chart member 35. Plate 42 is further provided with a series of vernier graduations 45 which, when used in combination with the marks of the movable chart member 35, can measure the distance between the work engaging or abutment members of the micrometer to one-tenth of one-thousandth of an inch. The graduations of the chart member 35 and plate 42 are necessarily very fine and in order to enable the operator to read these graduations readily, I provide a lens system 46 by means of which said graduations can be read in a magnified form without inconvenience or danger of misreading the measurements. This lens system is preferably arranged in a sleeve 47 which is mounted in one of the covers, preferably cover 14, and extends into the space formed by semi-cylindrical extension 11$^a$. A pair of lenses 48 is arranged in said tubular member by means of which the graduations of the members 35 and 42 can be read. The outer end of sleeve 47 terminates in a suitable annular extension or eyepiece 49.

Tubular member 47 is so disposed in cover 14 that the focal axes of lenses 48 are preferably in alignment with the meeting edges of members 35 and 42 as shown in Figure 3 in order to obtain uniform correlation of the marks or graduations of the respective members. Sleeve 47 is held in position on cover 14 in any suitable manner, such as a split sleeve 50 extending laterally from plate 14 and adapted to be drawn together to clamp sleeve 47 in position by suitable fastening devices 51.

The mounting 34 comprises a block 34$^a$ which is secured to cover 14 by screws 52 and is recessed as indicated at 34$^b$ to provide clearance for plunger 21 and pulley 30 as shown in Figure 3. Block 34$^a$ is provided with a suitable bore for forming a bearing for one end of shaft 32 while the opposite end of the shaft or the portion intermediate pulley 30 and chart 35 is journaled in a bore formed in plate 34$^b$ which is removably secured to block 34$^a$ by screws 54. This construction of mounting 34 permits ready detachment of the chart and pulley 30 by simply removing cover plate 12 of the casing and plate 34$^b$ of the mounting. When block 34$^a$ rests against the cover 14 the latter is provided with inwardly projecting parallel ribs 14$^a$ which engage the sides of block 34$^a$ and mount it in proper operative position, thereby relieving the attaching devices 52 of all strain.

The chart member 35 and plate 42 may be formed of transparent material with the marks or graduations opaque and the ground transparent, or vice versa, or said chart and plate may be formed of opaque material. Where said members are formed transparent a portion of cover 12 is cut out and a piece of glass 55 is placed therein to admit light in the rear of chart member 35 and plate 42. This plate of glass is held in position in any suitable manner, such as clips 56. A series of annularly disposed ridges or projections 57 is arranged on cover 12 adjacent to the window opening so as to protect window 55 and admit light thereto when the instrument is laid on the bench. Window 55 is preferably made of white translucent glass so as to provide a white background for the chart and the plate. If desired, the side wall of member 11 and extension 11ᵃ may be provided with window 55ᵃ as shown in Figure 9 which admits light into the chamber in which the chart member 35 and plate 42 are located, thereby enabling the reading thereof and permitting the use of transparent or opaque members 35 and 42.

Plunger 21 is operated by means of a button or finger piece 58 which is fixed to the outer end of a pin 59 the opposite end of which is seated in one end of plunger 21. This pin operates in a slot 24ᵃ formed in tubular extension 24 and also serves to hold plunger 21 against rotative movement.

In using the device, finger piece 58 is operated to move plunger 21 longitudinally so as to space the free end 20 thereof from the anvil 19 and permit the positioning of work to be measured between the points thereof. Plunger 21 is now moved in the opposite direction so as to bring its end 20 against the work, the latter being placed against anvil 19. The distance between the measuring points 19 and 20 will be accurately directed by chart member 35 which has been actuated in accordance with the movement of plunger 21 by means of flexible connections 27. There are preferably two of these connections, each having its inner end anchored to the pulley 30 and its opposite end to the respective arm 25ᵃ of collar 25. In this manner, one of the connections 27, when the plunger is operated in one direction, exerts a straight pull on pulley 30, thereby causing chart member 35 to be rotated in a corresponding direction while the other flexible connection 27 is wound up on the pulley, thereby being in condition to operate the chart member in the opposite direction when the movement of the plunger is reversed. The inner ends of connections 27 being secured to the pulley, no slippage is possible and the pulley 30 and chart member 35 are positively actuated in correlation with plunger 21.

In the modified form shown in Figures 10 to 12, a plunger 60 is provided with a rack 61 meshing with and adapted to actuate a pinion 62 which is carried by a shaft 64 on which is mounted the chart 35. The housing enclosing the operating mechanism is provided with a rear plate 65 formed integral with which is a tubular extension 66 which is in axial alignment with the lens system 46 of the device. Cover plate 65 is provided with suitable window opening which opens into the interior of tubular extension 66 and this window is closed by a piece of plain glass which admits light to the rear of chart member 35 of plate 42 but excludes dust and dirt from the interior of the casing. The outer end of tubular extension 66 is provided with a piece of white translucent glass 68 which forms a background for the transparent chart member and the plate. The annular wall of extension 66 is provided with a series of openings 69 for admitting light into the interior of the tubular extension 66. The front cover plate 70 provided with an extension or eyepiece 71 which extends a suitable distance away from the cover so as to protect the lens system from the light, thereby facilitating the reading of the chart members.

I claim:

1. A micrometer caliper comprising in combination a stationary work abutment member, a slidable work abutment member cooperating with the former, operating connections adjustably mounted on said slidable member, a measure indicia carrying disk member rotatable by said connections and in accordance with the movement of said slidable member to indicate the distance between said work abutment members, an optical system for reading portion of said indicia bearing member in a magnified form, and a stationary vernier scale in correlation with said indicia member.

2. A micrometer caliper comprising in combination a pair of measuring members, one of which is movable in axial direction relative to the other member, a rotatable measure indicia member, a fixed mark in cooperative relation with said indicia member for identifying an indicia occupying a predetermined position, and operating flexible connections fixed to said movable measuring member and engaging said indicia member for actuating the latter in accordance with the movement of said movable measuring member, and a lens system for reading in a magnified form said measure indicia and said indicia identifying mark.

3. A micrometer caliper comprising a pair of measuring work abutment members, one of which is movable relative to the other member, a measure indicia member movable by and in accordance with said movable abutment member to indicate the extent of movement thereof, a fixed mark for selectively indicating a measure indicia when said indicia member occupies a predetermined position, and a flexible operating means fixed to said movable abutment member and operatively interengaging said indicia member, said operating means being adjustable to correlate the zero positions of said interengaged members.

4. A micrometer caliper comprising a pair of measuring work abutment members, one of which is movable relative to the other member, a measure indicia member movable by and in accordance with said movable abutment member to indicate the extent of movement thereof, a fixed mark for selectively indicating a measure indicia when said indicia member occupies a predetermined position, an operating means fixed to said movable abutment member for interengaging said movable member with said indicia member, said operating means being adjustable relatively to said movable abutment member to correlate the zero positions of said interengaged members, and a lens system for magnifying said indicia and said mark.

5. A device of the class described comprising in combination a housing, a stationary work abutment member carried by and spaced from said housing, a movable work abutment member operatively mounted in said housing in correlation with said stationary member, a shaft journaled in said housing, a measure indicia bearing member mounted on said shaft, flexible connections between said movable work abutment member and said shaft, whereby said indicia bearing member is operable in correlation with said movable abutment member to indicate the distance between the work engaging points of said abutment members, a fixed mark mounted in said housing for indicating the measuring position of said indicia member, and a lens system adjustably arranged in said housing for magnifying said fixed mark and the contiguous portion of said measure indicia.

6. A device of the class described comprising a housing, a pair of measuring members, one of which is stationarily and the other movably mounted in said housing, a measure indicia bearing member rotatably mounted in said housing, flexible connections for operatively interengaging said indicia member with said movable measuring member to position said indicia member in accordance with the movement of said movable measuring member, a pointer fixedly arranged in said housing to correlate the indicia of said rotatable member with a predetermined fixed point, and a reading element for rendering visible in magnified form said measure indicia.

7. A micrometer caliper comprising a pair of work engaging elements, one of which is movable relative to the other, a measure indicia member, a pointer member for selectively pointing out one of the indicia, one of said members being movable relative to the other member, a flexible connection between said movable element and said indicia member to position the latter in correlation with the movement of said movable element, and a lens system for rendering visible in a magnified form said pointer and said indicia member.

In testimony whereof I hereunto affix my signature this 28th day of February, 1925.

HARRY C. SCHAPER.

CERTIFICATE OF CORRECTION.

Patent No. 1,664,833.   Granted April 3, 1928, to

HARRY C. SCHAPER.

It is hereby certified that error appears in the printed specification of the above numbered patent requiring correction as follows: Page 2, line 7, for the word "slightly" read "slidably", and line 18, for the word "Prospecting" read "Projecting"; and that the said Letters Patent should be read with these corrections therein that the same may conform to the record of the case in the Patent Office.

Signed and sealed this 1st day of May, A. D. 1928.

(Seal)

M. J. Moore,
Acting Commissioner of Patents.

4. A micrometer caliper comprising a pair of measuring work abutment members, one of which is movable relative to the other member, a measure indicia member movable by and in accordance with said movable abutment member to indicate the extent of movement thereof, a fixed mark for selectively indicating a measure indicia when said indicia member occupies a predetermined position, an operating means fixed to said movable abutment member for interengaging said movable member with said indicia member, said operating means being adjustable relatively to said movable abutment member to correlate the zero positions of said interengaged members, and a lens system for magnifying said indicia and said mark.

5. A device of the class described comprising in combination a housing, a stationary work abutment member carried by and spaced from said housing, a movable work abutment member operatively mounted in said housing in correlation with said stationary member, a shaft journaled in said housing, a measure indicia bearing member mounted on said shaft, flexible connections between said movable work abutment member and said shaft, whereby said indicia bearing member is operable in correlation with said movable abutment member to indicate the distance between the work engaging points of said abutment members, a fixed mark mounted in said housing for indicating the measuring position of said indicia member, and a lens system adjustably arranged in said housing for magnifying said fixed mark and the contiguous portion of said measure indicia.

6. A device of the class described comprising a housing, a pair of measuring members, one of which is stationarily and the other movably mounted in said housing, a measure indicia bearing member rotatably mounted in said housing, flexible connections for operatively interengaging said indicia member with said movable measuring member to position said indicia member in accordance with the movement of said movable measuring member, a pointer fixedly arranged in said housing to correlate the indicia of said rotatable member with a predetermined fixed point, and a reading element for rendering visible in magnified form said measure indicia.

7. A micrometer caliper comprising a pair of work engaging elements, one of which is movable relative to the other, a measure indicia member, a pointer member for selectively pointing out one of the indicia, one of said members being movable relative to the other member, a flexible connection between said movable element and said indicia member to position the latter in correlation with the movement of said movable element, and a lens system for rendering visible in a magnified form said pointer and said indicia member.

In testimony whereof I hereunto affix my signature this 28th day of February, 1925.

HARRY C. SCHAPER.

CERTIFICATE OF CORRECTION.

Patent No. 1,664,833.   Granted April 3, 1928, to

HARRY C. SCHAPER.

It is hereby certified that error appears in the printed specification of the above numbered patent requiring correction as follows: Page 2, line 7, for the word "slightly" read "slidably", and line 18, for the word "Prospecting" read "Projecting"; and that the said Letters Patent should be read with these corrections therein that the same may conform to the record of the case in the Patent Office.

Signed and sealed this 1st day of May, A. D. 1928.

(Seal)

M. J. Moore,
Acting Commissioner of Patents.